(12) United States Patent
Peters et al.

(10) Patent No.: US 12,151,183 B2
(45) Date of Patent: Nov. 26, 2024

(54) DISTILLATION APPARATUS

(71) Applicant: Clean Water Designs Ltd, Edinburgh (GB)

(72) Inventors: Duncan Peters, Edinburgh (GB); Constantine Talalaev, Edinburgh (GB)

(73) Assignee: Clean Water Designs LTD, Edinburgh (GB)

( * ) Notice: Subject to any disclaimer, the term of this patent is extended or adjusted under 35 U.S.C. 154(b) by 180 days.

(21) Appl. No.: 17/762,958

(22) PCT Filed: Sep. 25, 2019

(86) PCT No.: PCT/GB2019/052705
§ 371 (c)(1),
(2) Date: Mar. 23, 2022

(87) PCT Pub. No.: WO2020/065311
PCT Pub. Date: Apr. 2, 2020

(65) Prior Publication Data
US 2023/0001322 A1    Jan. 5, 2023

(30) Foreign Application Priority Data
Sep. 25, 2019   (GB) .................................... 1815616

(51) Int. Cl.
*B01D 1/28*     (2006.01)
*B01D 1/08*     (2006.01)
(Continued)

(52) U.S. Cl.
CPC ............. *B01D 1/2893* (2013.01); *B01D 1/08* (2013.01); *B01D 1/2887* (2013.01); *B01D 3/007* (2013.01);
(Continued)

(58) Field of Classification Search
CPC ...... B01D 1/08; B01D 1/2887; B01D 1/2893; B01D 3/007; B01D 5/0039; B01D 5/006; C02F 1/041
See application file for complete search history.

(56) References Cited

U.S. PATENT DOCUMENTS 2,895,546 A * 7/1959 Sadtler ..................... B01D 1/12
                                                       203/25
3,956,072 A * 5/1976 Huse ....................... B01D 1/289
                                                      202/180
(Continued)

FOREIGN PATENT DOCUMENTS

WO    WO-2004/043566 A2    5/2004
WO    WO-2018/161167 A1    9/2018

OTHER PUBLICATIONS

International Search Report and Written Opinion for International Application No. PCT/GB2019/052705 dated Mar. 19, 2020.

*Primary Examiner* — Jonathan Miller
(74) *Attorney, Agent, or Firm* — Harness, Dickey & Pierce, P.L.C.

(57) ABSTRACT

A distillation apparatus is disclosed herein. The distillation apparatus comprises an evaporation chamber, a heat source arranged to provide heat to the evaporation chamber, one or more condensing chambers located at least partially inside the evaporation chamber, a fluid inlet connected to the evaporation chamber, one or more fluid outlets attached to the one or more condensing chambers and a vapour compressor pump. Also disclosed is a liquid ring pump suitable for use with such a distillation apparatus, the pump comprising a pump body, a pump compression chamber provided within the pump body, a rotor mounted within the compression chamber, a rotor axle to mount said rotor, the rotor being provided with one or more ceramic bearings to mount it to the rotor axle.

11 Claims, 17 Drawing Sheets

(51) Int. Cl.
*B01D 3/00* (2006.01)
*B01D 5/00* (2006.01)
*C02F 1/04* (2023.01)
*F04C 19/00* (2006.01)

(52) U.S. Cl.
CPC ............ *B01D 5/0039* (2013.01); *B01D 5/006* (2013.01); *C02F 1/041* (2013.01); *F04C 19/00* (2013.01); *C02F 2303/10* (2013.01); *F04C 2240/40* (2013.01); *F04C 2240/50* (2013.01)

(56) References Cited

U.S. PATENT DOCUMENTS

| | | | | |
|---|---|---|---|---|
| 4,226,574 A * | 10/1980 | Villette | ................. | F04D 13/025 310/104 |
| 4,585,524 A * | 4/1986 | Hoiss | ................. | C02F 1/045 203/11 |
| 4,902,197 A * | 2/1990 | Rhodes | ................. | F04D 29/104 415/171.1 |
| 4,919,592 A * | 4/1990 | Sears | ................. | F04D 29/4253 415/207 |
| 5,587,054 A * | 12/1996 | Keith | ................. | B01D 3/14 202/202 |
| 5,597,453 A * | 1/1997 | Sears | ................. | B01D 1/2887 159/DIG. 42 |
| 5,645,694 A * | 7/1997 | Stewart | ................. | B01D 1/2887 202/180 |
| 5,772,850 A * | 6/1998 | Morris | ................. | B01D 1/305 159/24.2 |
| 5,968,321 A * | 10/1999 | Sears | ................. | B01D 3/42 203/1 |
| 8,282,790 B2 * | 10/2012 | Demers | ................. | B01D 1/065 203/40 |
| 8,858,758 B2 * | 10/2014 | Zebuhr | ................. | C02F 1/08 159/6.3 |
| 9,908,789 B2 * | 3/2018 | Ward | ................. | C02F 1/18 |
| 2003/0132096 A1 * | 7/2003 | Zebuhr | ................. | B01D 3/08 202/172 |
| 2004/0099521 A1 * | 5/2004 | Demers | ................. | B01D 1/221 203/40 |
| 2005/0016828 A1 * | 1/2005 | Bednarek | ................. | B01D 3/42 203/1 |
| 2005/0183832 A1 * | 8/2005 | Owens | ................. | F28F 13/00 203/10 |
| 2009/0145737 A1 * | 6/2009 | Kamen | ................. | C02F 1/16 202/185.1 |
| 2012/0037488 A1 * | 2/2012 | Zebuhr | ................. | B01D 1/2887 202/185.1 |
| 2016/0130156 A1 * | 5/2016 | Ward | ................. | B01D 1/221 202/177 |

* cited by examiner

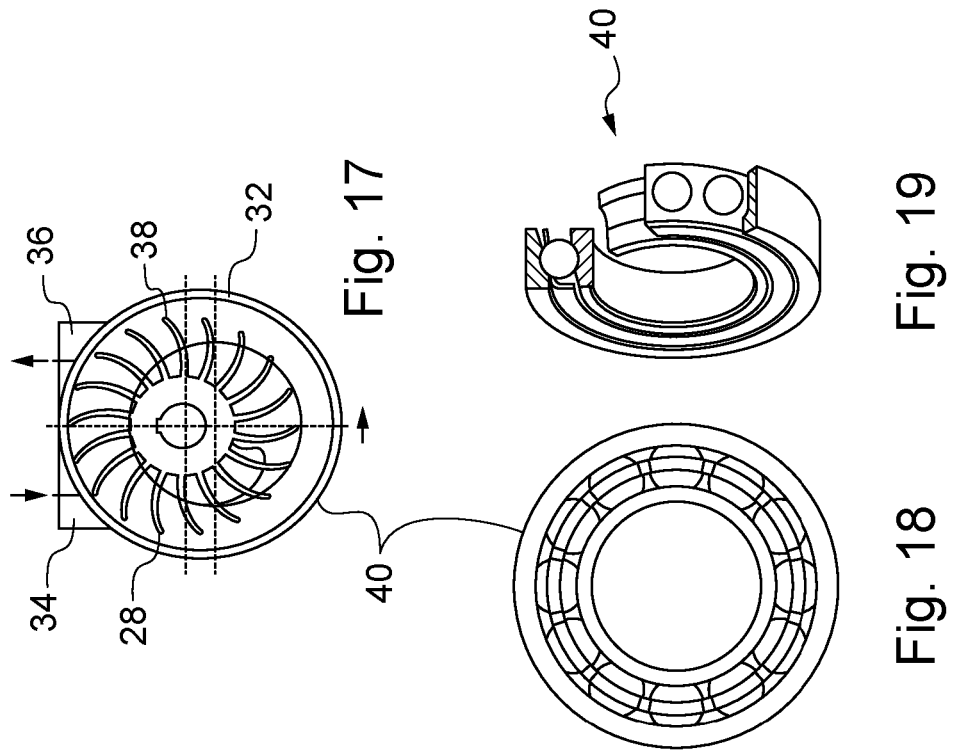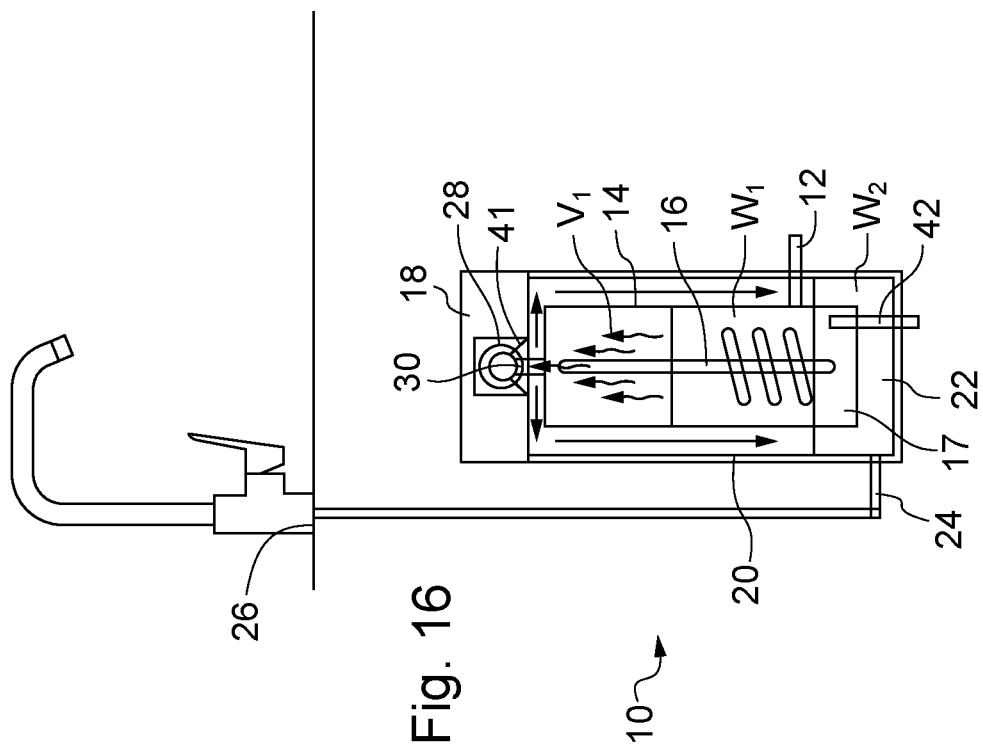

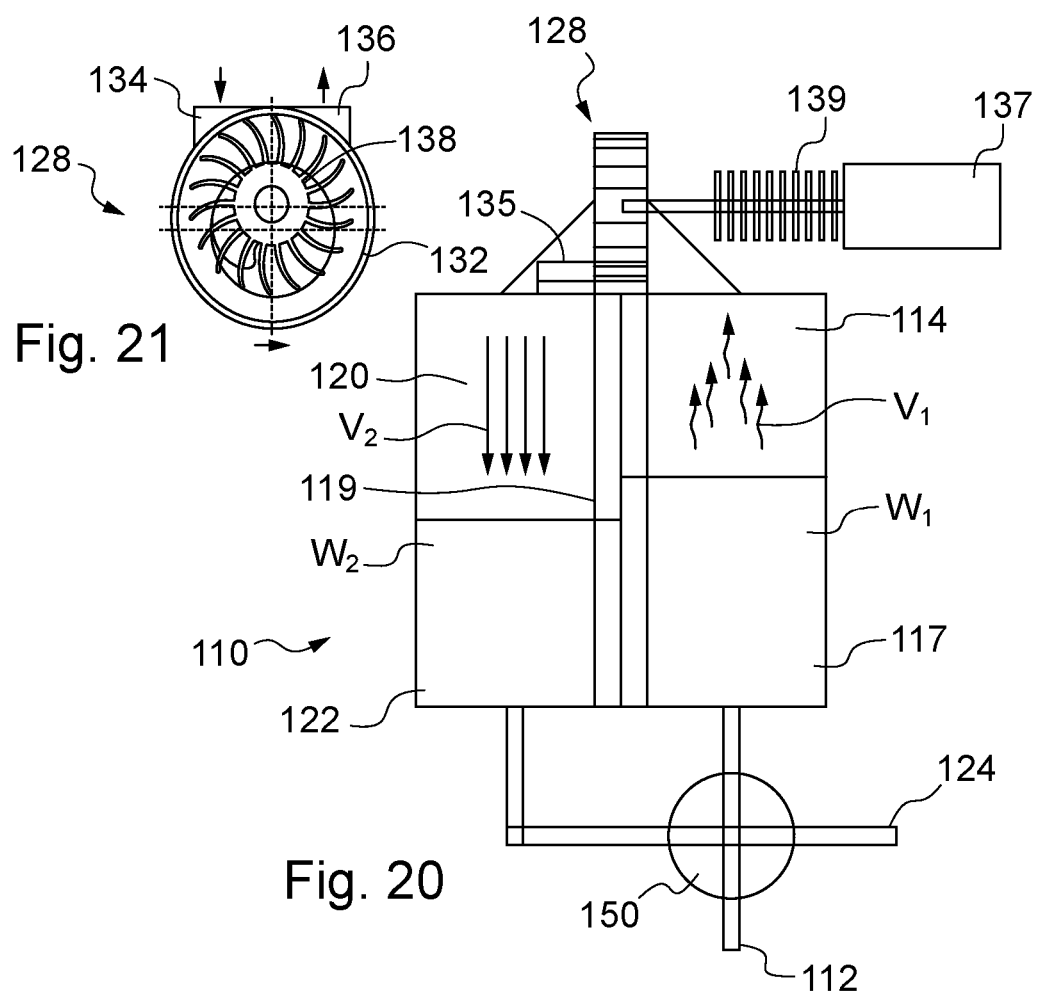

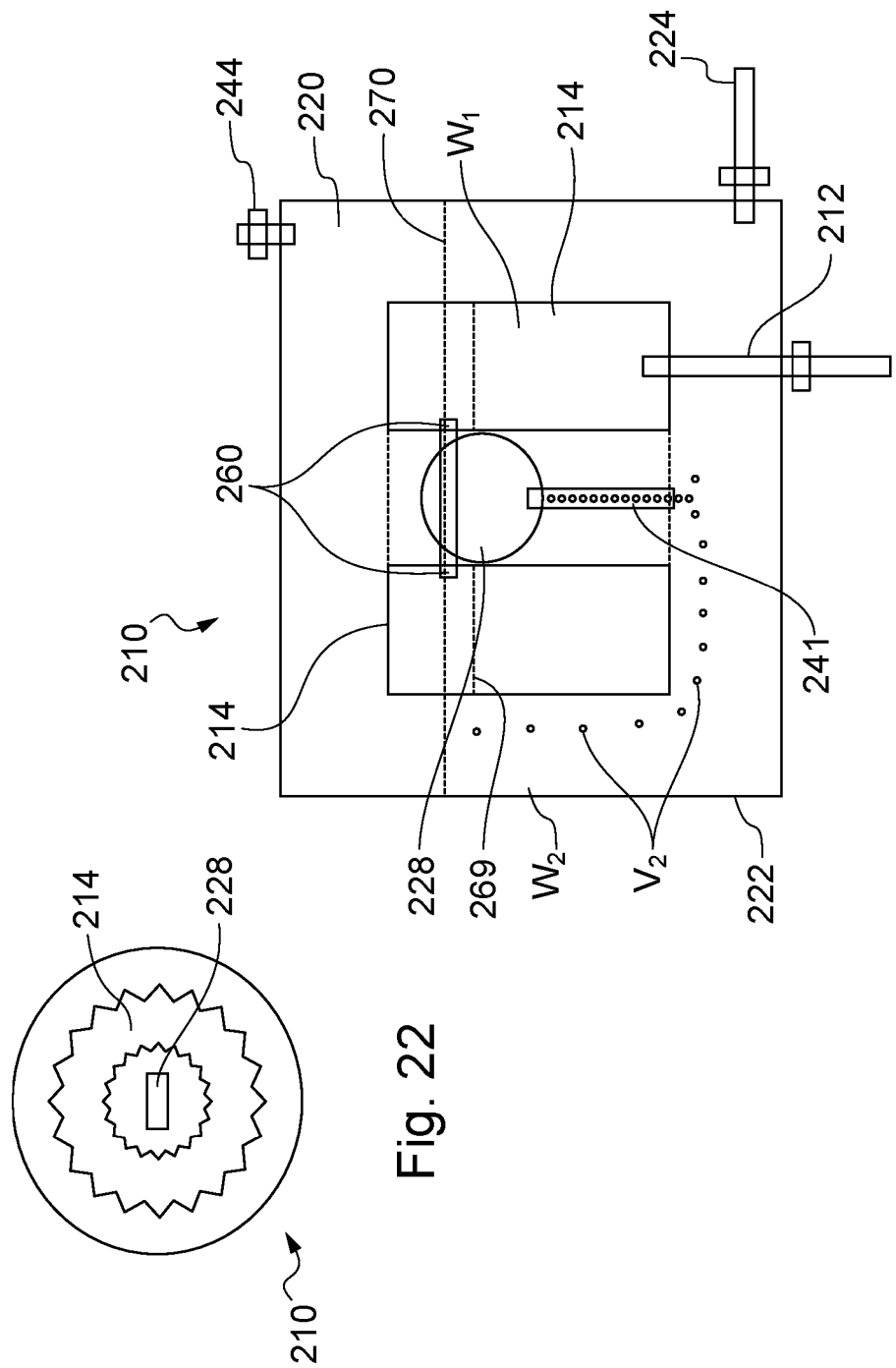

DISTILLATION APPARATUS

CROSS-REFERENCE TO RELATED APPLICATIONS

This application is a national phase under 35 U.S.C. § 371 of PCT International Application No. PCT/GB2019/052705 which has an International filing date of Sep. 25, 2019, the entire contents of each of which are hereby incorporated by reference.

FIELD OF THE INVENTION

The present invention relates to a distillation apparatus, especially such apparatus that may be deployed within a commercial, domestic or near-domestic situation to provide distilled water on demand.

Background to the Invention

Pressures on fresh water supplies have become and continue to be greater as the world's population increases and requires more to survive.

Increasingly more use will have to be made of less directly potable sources of water, such as that which may be contaminated, brackish or otherwise deemed of previously marginal value. Moreover, quality in domestic mains supplies may deteriorate because of such factors as drought, contamination (such as by plastics and micro-plastics as these contaminate the water supply) ageing infrastructure and inability to cope with future demand Distillation provides one solution to this problem, but previous distillation plants tended to be energy hungry, large, unwieldy, uneconomical and suitable only for large scale supplies, such as for a town.

It would be useful to provide such apparatus for more individual or localised use, such as within a kitchen or a communal water source, and servicing potentially a smaller number of people and suitable for use with smaller and more marginal supplies.

Such water may be necessary for hospital supplies, drinking water, clinics, laboratories, remote dwellings and villages; in short, anywhere it may be advantageous to improve the quality of the water available.

Furthermore, the apparatus may be of use in applications where distillation may be necessary to create or improve a product, such as small-scale alcoholic beverage production or soft drink dispensing.

SUMMARY OF THE INVENTION

According to a first aspect of the present invention there is provided a distillation apparatus comprising an evaporation chamber, a heat source arranged to provide heat to the evaporation chamber, one or more condensing chamber(s) located at least partially adjacent the evaporation chamber, a fluid inlet connected to the evaporation chamber, one or more fluid outlets attached to the one or more condensing chambers and a vapour compressor pump.

By being adjacent, heat transfer may take place between the condensing chamber(s) and the evaporation chamber. Specifically, pre-evaporated liquid within the evaporation chamber may receive heat from vapour within the condensing chamber(s), thereby improving the vapour s condensation.

The condensing chamber(s) may be located at least partially within the evaporation chamber.

The condensing chamber(s) may be located wholly within the condensing chamber.

The evaporation chamber may have an additional fluid outlet.

The evaporation chamber may be provided with a steam inlet.

The evaporation chamber may be provided with a vent outlet.

There may be multiple condensing chambers.

There may be four condensing chambers.

The condensing chamber(s) may comprise a cuboidal shape.

The condensing chamber(s) may have a larger internal and/or external surface area than the internal surface of the evaporation chamber. Steam to surface heat transfer is less than liquid to surface heat transfer. This may be improved/mitigated by having enhanced surfaces inside the condensing chamber.

The condensing chamber(s) may comprise a square face with relatively thin connecting webs. This may enhance the internal and/or external surface area of the condensing chamber.

The condensing chamber(s) may comprise a cuboidal shape with a width:height:depth ratio of 20:20:1.

The condensing chamber(s) may include one or more internal condenser fin(s)s. These may increase the internal surface area of the condenser(s) to improve condensation.

The internal condenser fin(s) may comprise rectangular fins projecting generally perpendicularly internally from either or both of the square faces.

The internal condenser fin(s) may comprise L-shaped sections attached to an interior side wall of the condenser(s). These may also comprise U-shaped, W-shaped, or other suitable shapes to increase surface area.

The condenser(s) may include an internal honeycomb structure. This may be to improve condensation.

The condenser(s) may include an internal latticework structure. This may be to improve condensation.

The condenser(s) may have a greater internal surface area than external surface area.

The one or more condensing chamber(s) may have one or more condenser fluid outlets.

The one or more condensing chamber(s) may share a single condenser fluid outlet pipe.

The vapour compressor pump may be a liquid ring pump.

The vapour compressor pump may be a lubricating gerotor pump.

The vapour compressor pump may include a rotor rotating on an axis, that axis being vertical when the invention is properly orientated and functioning.

The vapour compressor pump may be located below the evaporation chamber. This may allow distillate to fall into the pump under the action of gravity. Since the distillate lubricates the pump, the pump should have sufficient lubricant upon starting the apparatus and effectively self primes.

There may be a vapour inlet connecting a head space of the evaporation chamber with the vapour compressor pump.

There may be one or more pump outlet(s) connecting the vapour compressor pump to at least one of the condensing chambers.

There may be a pump vapour outlet pipe which connects to all of the condensing chambers.

The liquid ring pump may comprise a pump body, a pump compression chamber provided within the pump body, a rotor mounted within the compression chamber, a rotor axle to mount said rotor, the rotor being provided with one or more ceramic bearings to mount it to the rotor axle.

The rotor may include one or more magnets.

There may be a plurality of magnets surrounding the rotor axle embedded within the body of the rotor.

The magnets may be used to spin the rotor and may also create tension in a bearing to mitigate backlash.

The pump may provide the rotor element.

There may be provided an electric motor to power the liquid ring pump. Other suitable rotational motion sources may be used such as mechanical power, internal combustion engine, gas turbine, wind turbine, hydro-power, steam engine, Stirling engine, etc.

There may be provided a magnetic transmission element coupled to the electric motor.

The magnetic transmission element may comprise a motor ring with one or more magnets provided around the motor ring.

The magnetic transmission element(s) attract the magnet(s) within the rotor, causing the latter to rotate. This enables the rotor element to be completely sealed within the pump body.

It will be appreciated by the skilled addressee that the magnet pairs in the transmission/rotor may be replaced with a pair of magnets/ferromagnetic material.

According to a second aspect of the present invention there is provided a distillation apparatus comprising an evaporation chamber, a heat source arranged to provide heat to the evaporation chamber, a condensing chamber and a vapour compressor pump attached at an inlet side to the evaporation chamber and at an outlet side to the condensing chamber, the outlet side being directed at least partially towards a heat exchanger, the heat exchanger being located between the evaporation chamber and the condensing chamber.

The heat exchanger enables heat transfer from condensing vapour in the condensing chamber to evaporating fluid in the evaporation chamber, thereby improving efficiency. The latent heat of condensation at higher pressure (and temperature) may help to boil the fluid in the evaporation chamber.

The heat exchanger may provide a structural element to the evaporation chamber and/or the condensing chamber.

This may provide the advantage of reducing the overall size of the apparatus by incorporating a dual function element being both a heat exchanger and a structural element.

The heat exchanger may be corrugated, rippled or otherwise shaped to increase its surface area.

The shape may increase strength/stiffness of the heat exchanger/structural element, thereby potentially further reducing the size of the apparatus to enable a discreet domestic installation.

There may be provided a discharge pipe on the pump outlet.

The discharge pipe may be directed towards the heat exchanger.

The condensing chamber and the evaporation chamber may be joined along a sidewall.

The sidewall may be the heat exchanger/structural element.

The condensing chamber may be located within the evaporation chamber.

The condensing chamber may have a generally circular cross-section.

The evaporation chamber may have a generally circular cross-section.

Circular may include oval, obround, elliptical, etc.

The outer surface of the evaporation chamber may be corrugated, rippled or otherwise shaped to increase its surface area.

The inner surface of the condensing chamber may be corrugated, rippled or otherwise shaped to increase its surface area.

The inner surface of the condensing chamber may be coated.

The coating may be glass, ceramic, plastics; or some other generally inert material to mitigate contamination of the distilled water.

The evaporation chamber may have a sump portion at its lowermost portion. This sump holds untreated water prior to distillation.

The condensing chamber may have a sump portion at its lowermost portion. This sump holds distilled water after distillation.

The evaporation chamber sump may be located at least partially within the condensing chamber sump.

This may allow additional heat transfer between hotter, distilled water in the condensing chamber sump and the cooler, untreated water in the evaporation chamber sump, potentially improving the efficiency of the apparatus.

A cyclone may be provided between the evaporation chamber and the pump.

The cyclone may separate water droplets from the evaporated vapour.

The vapour may be passed through an aeration device prior to being sent into the condensed distilled liquid.

The aeration device may be a diffuser.

The diffuser may be a bubble diffuser.

According to a third aspect of the present invention there is provided a liquid ring pump comprising a pump body, a pump compression chamber provided within the pump body, a rotor mounted within the compression chamber, a rotor axle to mount said rotor, the rotor being provided with one or more ceramic bearings to mount it to the rotor axle.

The ceramic bearings may be lubricated by liquid compressed from fluid passing through the compression chamber and/or condenser.

The rotor may include one or more magnets.

There may be a plurality if magnets surrounding the rotor axle embedded within the body of the rotor.

There may be provided an electric motor to power the liquid ring pump.

There may be provided a magnetic transmission element coupled to the electric motor. Other suitable rotational motion sources may be used such as mechanical power, internal combustion engine, gas turbine, wind turbine, hydro-power, steam engine, Stirling engine, etc.

The magnetic transmission element may comprise a motor ring with one or more magnets provided around the motor ring.

The magnetic transmission element(s) attract the magnet(s) within the rotor, causing the latter to rotate. This enables the rotor element to be completely sealed within the pump body.

The liquid ring pump may have a cooling jacket surrounding the compression chamber. This cooling jacket may be fed from liquid being fed into an evaporative process or apparatus in which the pump is being employed. The cooling jacket may in addition or as an alternative be fed from liquid pooling in an evaporation chamber of the evaporative process or apparatus. The cooling jacket may impede the ambient temperature from exceeding the boiling point of liquid being fed into it as part of such a process, and mitigating damage caused by cavitation effects to the rotor and/or other parts of the pump.

It will be appreciated by the skilled addressee that the magnet pairs in the transmission/rotor may be replaced with a pair of magnets/ferromagnetic material.

The pump rotor itself may be formed as the rotor of an electric motor. Ferromagnetic poles of a stator of such an arrangement may be sealed and embedded within the pump's body. While the electric windings may be subjected to an elevated temperature, they should not be directly exposed to steam (or other gaseous distillate(s)) and therefore enhanced cooling may not be required. This may be achievable with a small diameter pump or a turbine compressor with low torque requirements.

BRIEF DESCRIPTION OF THE DRAWINGS

Embodiments of the invention will now be described, by way of example only, with reference to the following drawings, in which:

FIG. 16 is a schematic representation of a second embodiment distillation apparatus according to the present invention;

FIG. 17 is an end elevation of a liquid ring pump of the first embodiment distillation apparatus of FIG. 16;

FIG. 18 is an end elevation of a ceramic bearing of the liquid ring pump of FIG. 17;

FIG. 19 is a part-sectional perspective view of the ceramic bearing of FIG. 17;

FIG. 20 is a schematic representation of a second embodiment distillation apparatus according to the present invention;

FIG. 21 is an end elevation of a liquid ring pump of the first embodiment distillation apparatus of FIG. 20;

FIG. 22 is a plan view of a third embodiment distillation apparatus according to the present invention;

FIG. 23 is a schematic representation of a third embodiment distillation apparatus according to the present invention;

Figure 1:
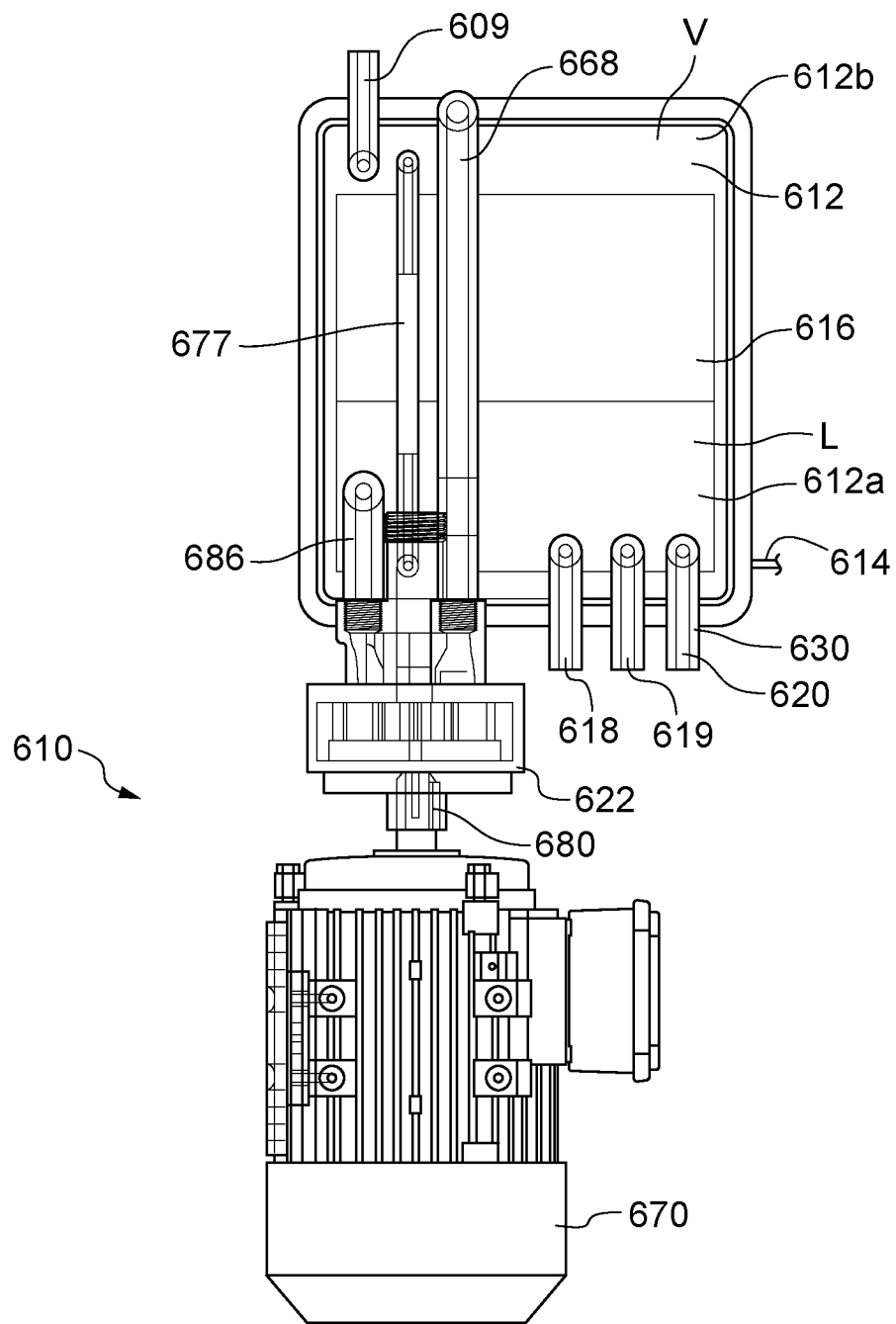
FIG. 1 is a side transparent elevation of a distillation apparatus according to a first aspect of the present invention.
Figure 2:
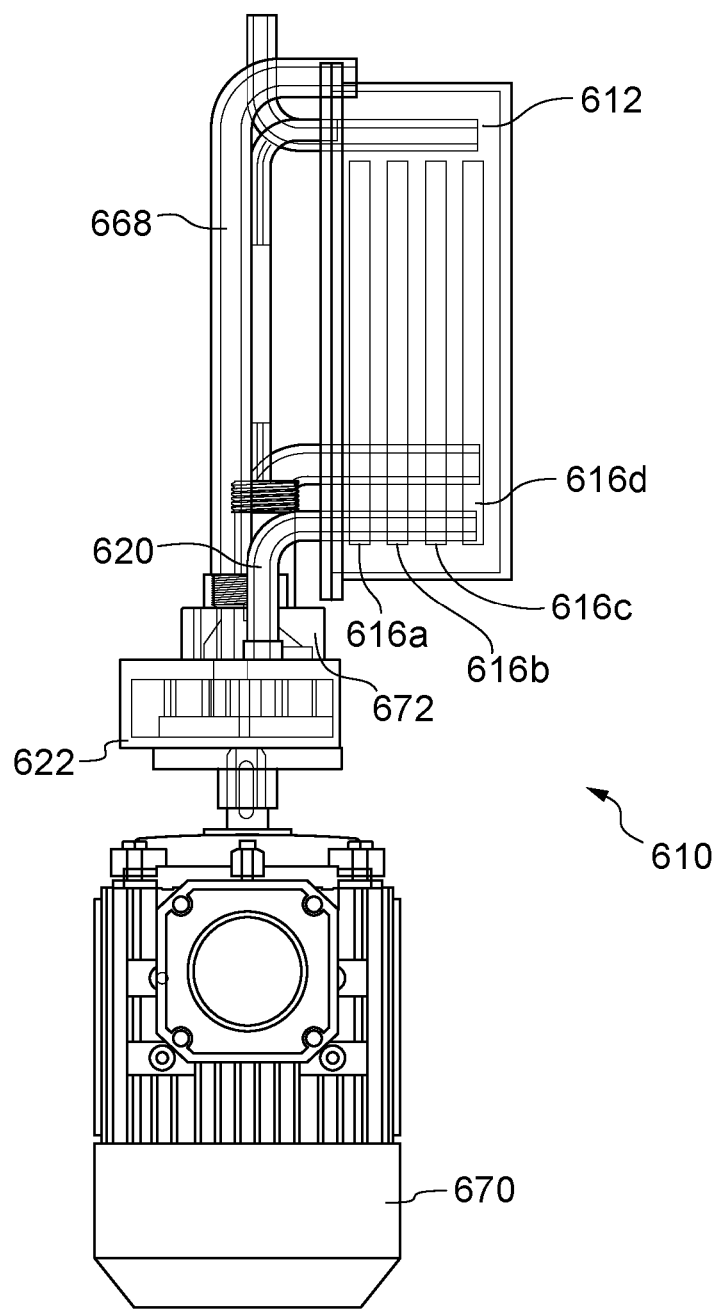
FIG. 2 is an end transparent elevation of the distillation apparatus of FIG. 1.
Figure 3:
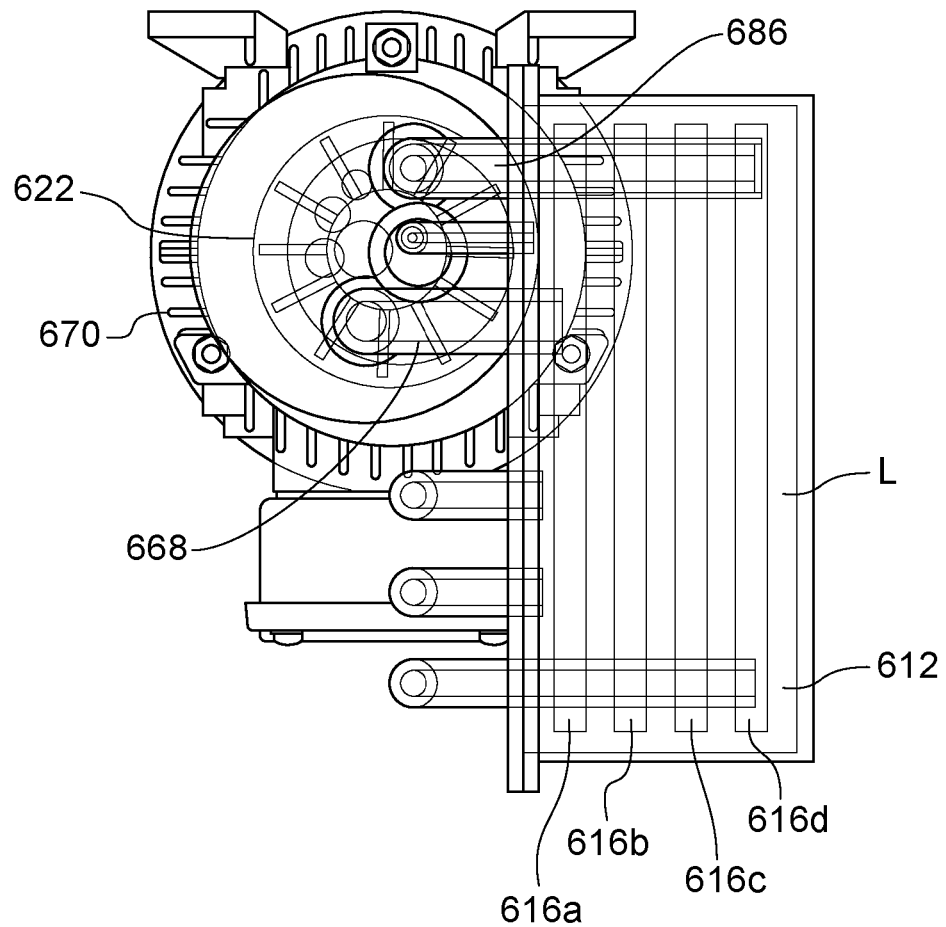
FIG. 3 is a plan transparent elevation of the distillation apparatus of FIG. 1.
Figure 4:
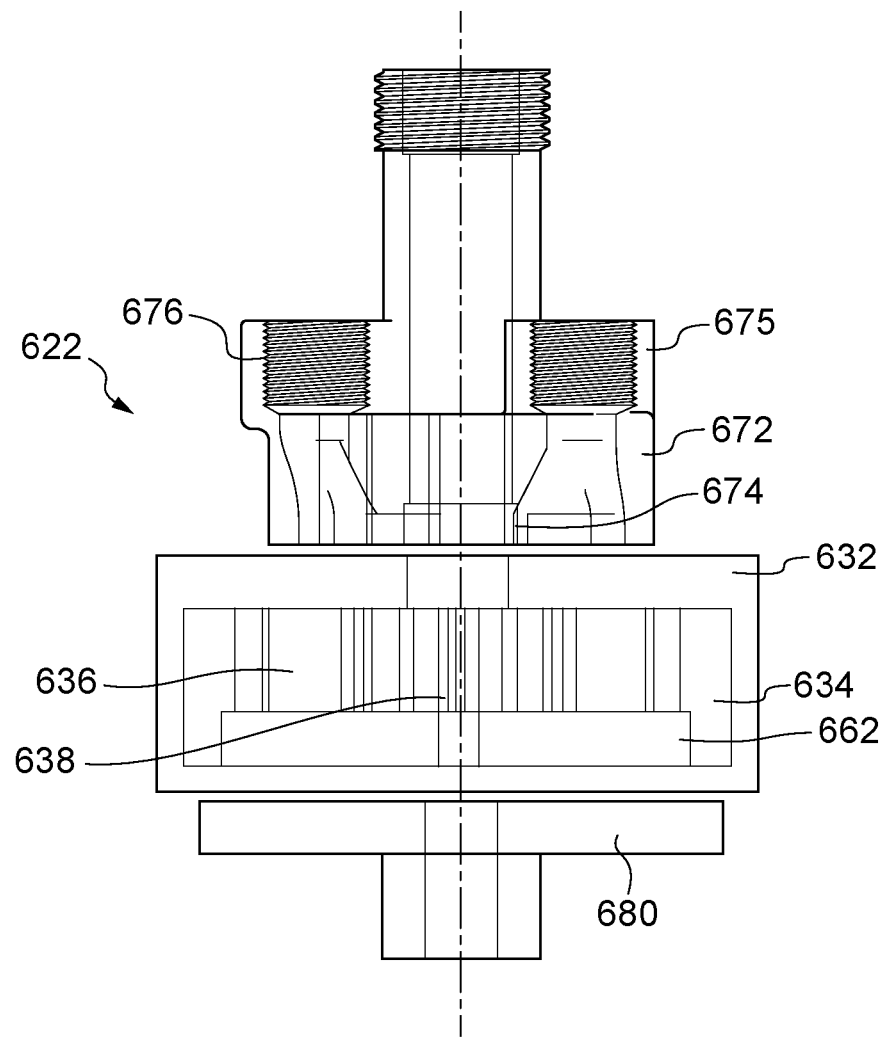
FIG. 4 is an end transparent elevation of a liquid ring pump of the apparatus of FIG. 1.
Figure 5:
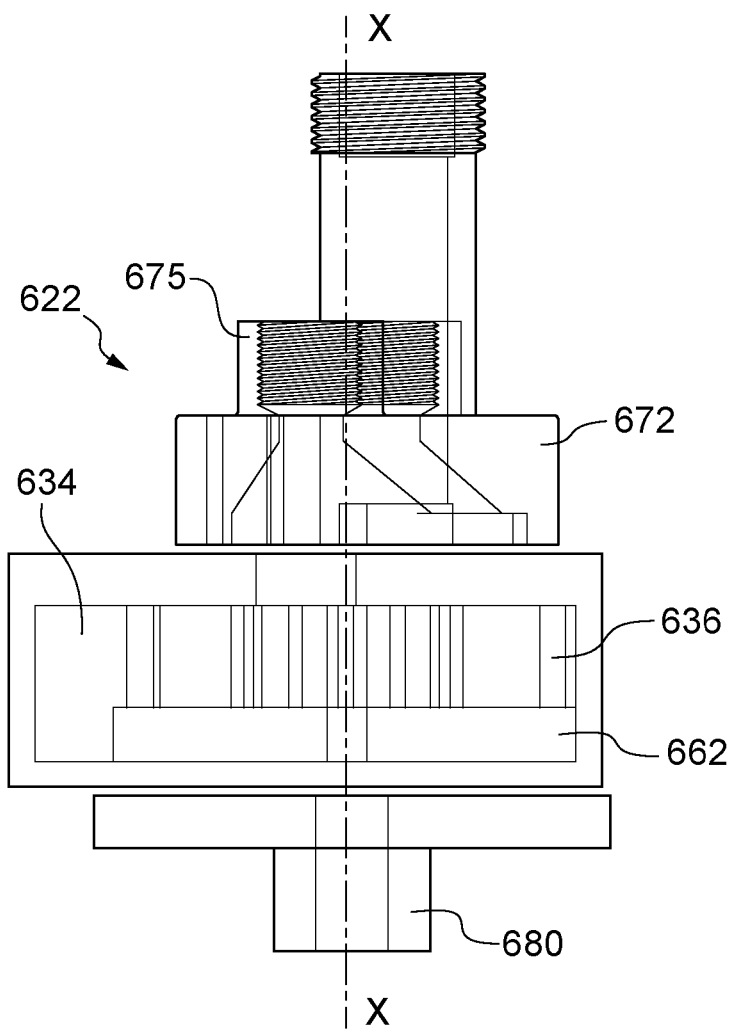
FIG. 5 is a side transparent elevation of a liquid ring pump of the apparatus of FIG. 1.
Figure 6:
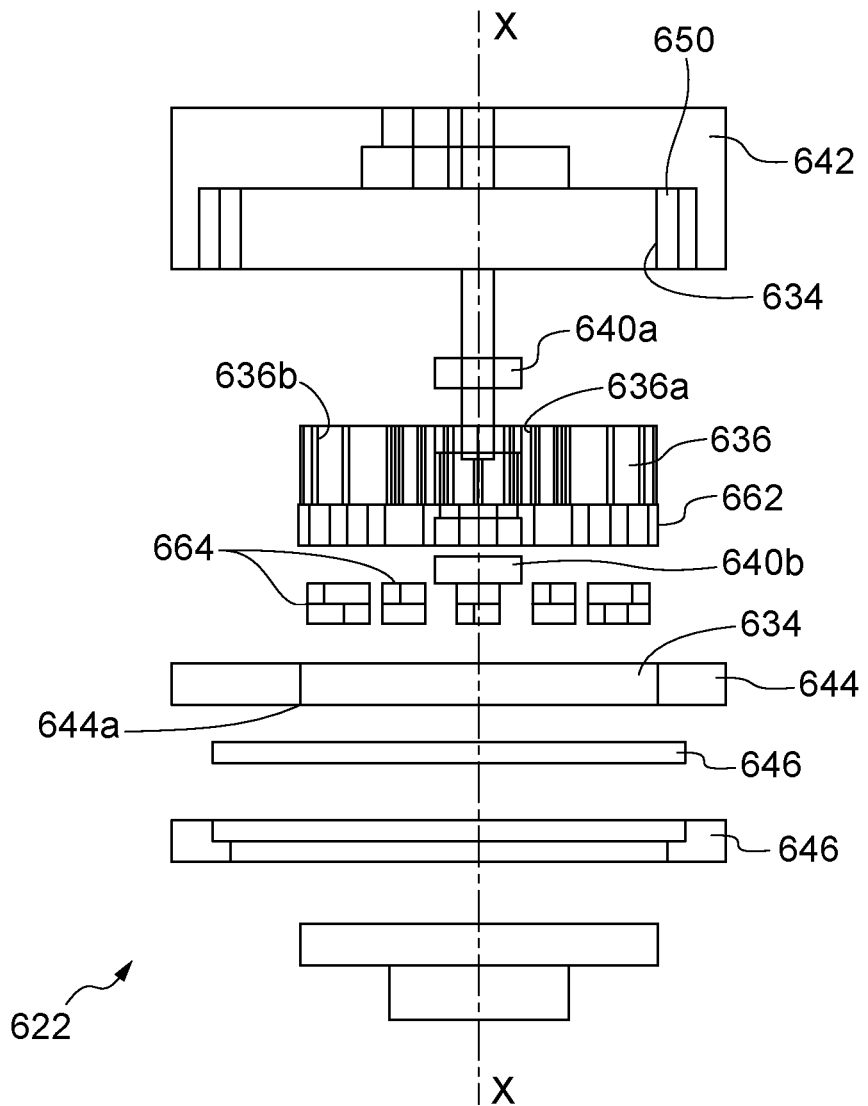
FIG. 6 is a side exploded view of the liquid ring pump of FIG. 5.
Figure 7:
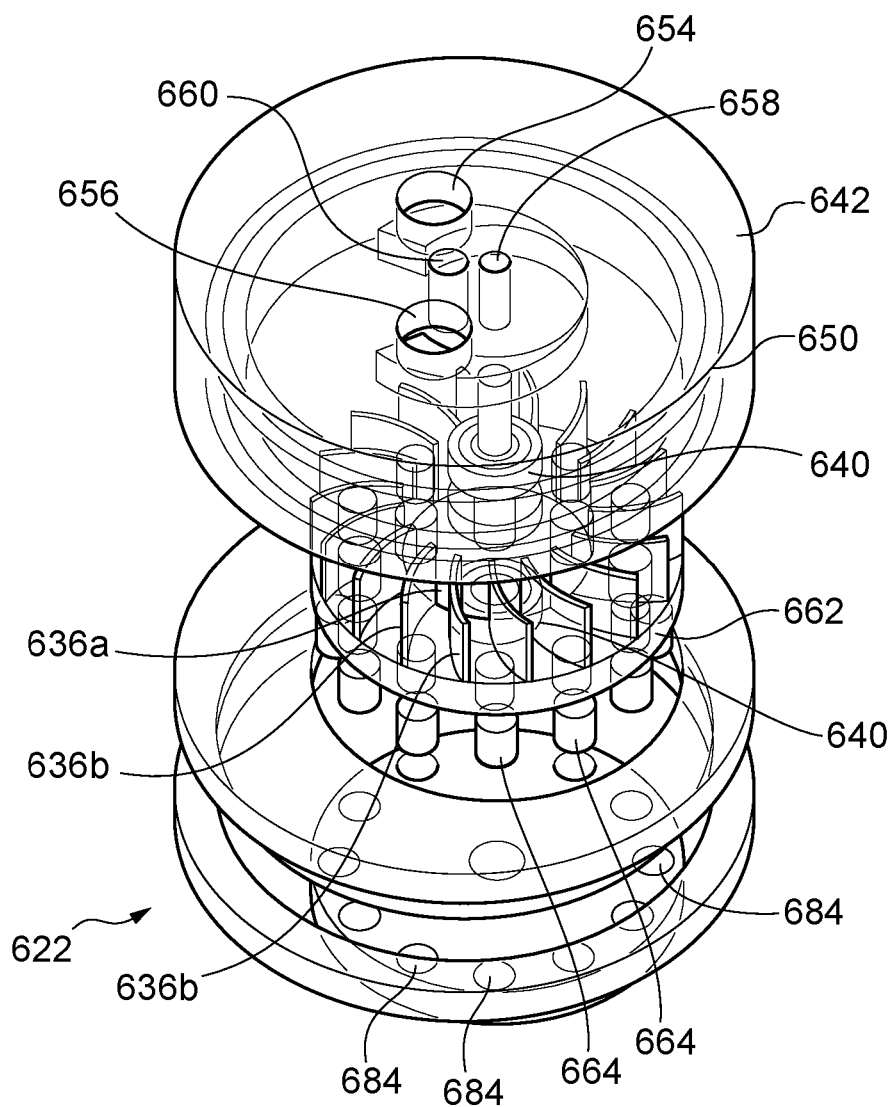
FIG. 7 is a perspective exploded view of the liquid ring pump of FIG. 5.
Figure 8:
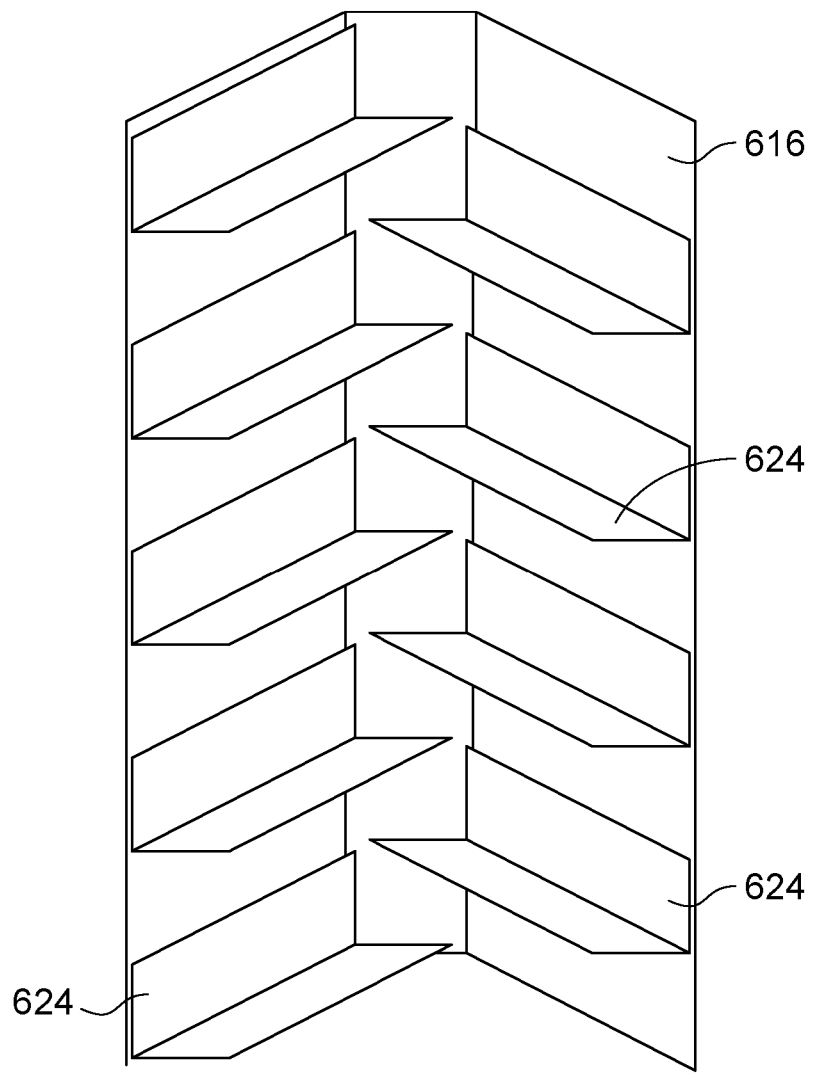
FIG. 8 is a perspective partially exploded view of a condenser of the apparatus of FIG. 1.

Referring to the drawings and initially to FIG. 1, a first embodiment distillation apparatus 610 is depicted.

Distillation apparatus 610 comprises an evaporation chamber 612, a heat source 614 arranged to provide heat to the evaporation chamber 612, one or more condensing chambers 616 located at least partially adjacent the evaporation chamber 612, a fluid inlet 618 connected to the evaporation chamber 612, one or more condenser fluid outlets 620 attached to the one or more condensing chambers 616 and a vapour compressor pump 622.

By being adjacent, heat transfer may take place between the condensing chamber(s) 616 and the evaporation chamber. Specifically, pre-evaporated liquid within the evaporation chamber 612 may receive heat from vapour within the condensing chamber(s) 616, thereby improving the vapour s condensation.

The condensing chamber(s) 616 are located at least partially within the evaporation chamber 612.

The condensing chamber(s) 616 are wholly within the condensing chamber 612.

The fluid inlet 618 will typically be a valved connection to a water source, which may be provided under a pressure, even if just a head of standing water. An evaporation drain pipe 619 is provided on the evaporation chamber 612. In the present embodiment these are provided adjacent each other and communicate with the bottom of the evaporation chamber 612. The fluid inlet 618 allows the evaporation chamber 612 to be filled with liquid to be distilled, and the evaporation drain pipe 619 allows liquid to be emptied from the chamber 612. They may also be used to clean the chamber 612 by simply flushing liquid and/or a suitable cleaning product through.

A heat source 614 is applied to the evaporation chamber. In the present embodiment, that is an electrical induction unit (not shown), but alternative heat sources are viable and envisaged within the scope of the present invention such as coil heating, direct heat source, combustion, and so forth. The primary function of the heat source 614 is to, of course, evaporate liquid within the evaporation chamber 612.

In the present embodiment there are four condensing chambers, 616a, 616b, 616c and 616d (numbered from nearside condensing chamber 616a to offside condensing chamber 616d; "nearside" being measured as adjacent the inlet side of the apparatus 610 i.e. the left hand side of FIG. 1). These are all located within the evaporation chamber 612. It will be appreciated that these may be varied in number, from one to beyond four.

The condensing chambers 616 each comprise a cuboidal shape. This is a relatively thin, laminar shape, being 20 cm×20 cm on its long sides, and 1 cm in depth. It will be appreciated by the skilled addressee that these dimensions may be altered depending on certain factors. The condensing chambers 616 comprise a square face with relatively thin connecting webs in the present embodiment. The relatively large surface area to volume ratio of the condensing chambers 616 improves heat transfer from within to outside the condensing chambers 616. The condensing chambers 616 are made from a suitable stainless steel, although it will be appreciated that alternative materials are possible. The stainless steel is preferably a 300 Series stainless steel, such as a food-grade 304 or medical grade 318.

The condensing chamber(s) 616 have a larger internal and/or external surface area than the internal surface of the evaporation chamber 612.

The condensing chamber(s) 616 comprise a square face with relatively thin connecting webs. This may enhance the internal and/or external surface area of the condensing chamber 616.

Condenser fins 624 are provided within the interior volume of the condensing chambers 616. These increase the internal surface area of the condensing chamber(s) to improve condensation.

The internal condenser fins 624 comprise rectangular fins projecting generally perpendicularly internally from both of the square faces, although it will be appreciated that they project from only one internal surface.

The internal condenser fins 624 comprise L-shaped sections 626 attached to the interior side wall of the condensing chamber 616 by spot-welding. The condensing chambers 616 may be formed from a pressed metal blank (not shown) which may be bent and welded into shape. Alternative fabrication methods are possible.

Figure 9:
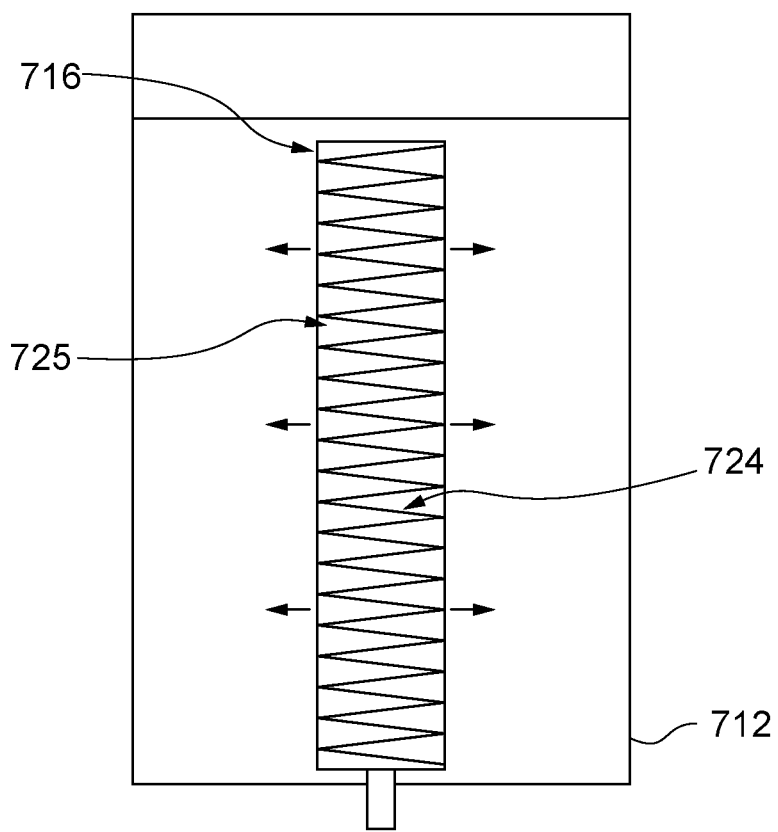
FIG. 9 is a sectional plan view of an alternative embodiment of condensing chamber usable with the apparatus of FIG. 1.

In FIG. 9 there is shown a cross-section of an alternative embodiment heat exchanger 716. An internal lattice structure 724 is provided as an alternative to the heating fins 624. This lattice or honeycomb-like structure 724 likewise increases the surface are upon which heat transfer and condensation can take place within the heat exchanger 724. In addition, a copper coating 725 is provided on the internal surface on the heat exchanger 716.

Figure 10:
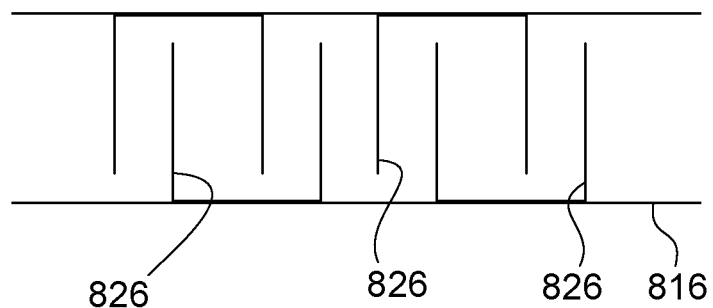
FIG. 10 is a sectional plan view of a further alternative embodiment of condensing chamber usable with the apparatus of FIG. 1.

In FIG. 10 there is shown a cross-section of a further alternative embodiment heat exchanger 816. U-shaped channels 826 replace the L-shaped sections 624 of the first embodiment. These U-shaped channels 826 provide a further increase in internal surface area for heat transfer/condensation to occur.

Figure 11:
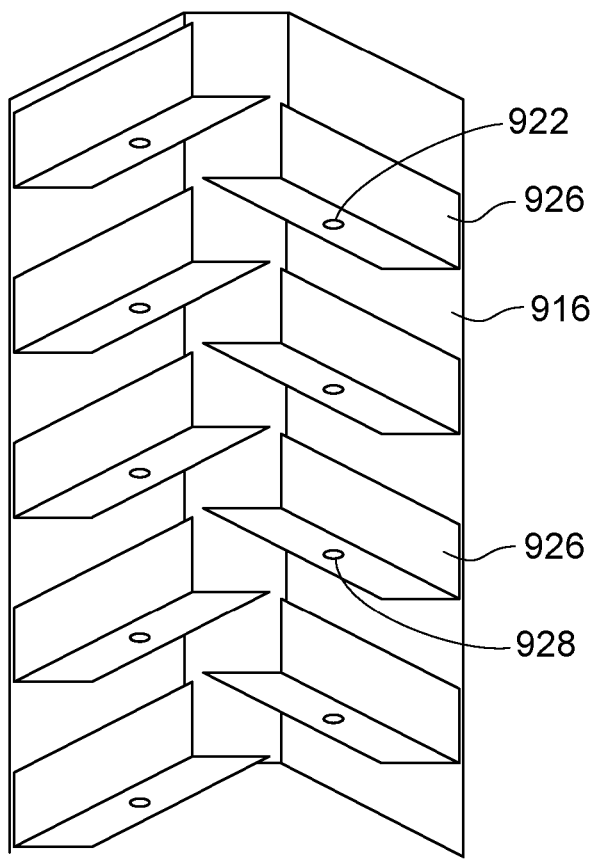
FIG. 11 is a sectional plan view of a yet further alternative embodiment of condensing chamber usable with the apparatus of FIG. 1.

In FIG. 11 there is shown a perspective view of a further alternative embodiment heat exchanger 916. The L-shaped sections 926 are similar to those of the first embodiment, but are provided with an aperture 928 on the projecting surface. These may be used to mount a reinforcing strut or rod (not shown) to mitigate any bulging or ballooning the heat exchanger 916 may be subjected to due to internal pressure.

The fins may also comprise U-shapes, W-shapes, or other 15 suitable shapes to increase surface area.

The condensing chamber(s) 616 will have a greater internal surface area than external surface area, thus improving heat transfer and condensation.

A condenser fluid outlet pipe 630 is provided. It is a simple pipe which attaches to all of the condensing chambers 616a, 616b, 616c and 616d. The condenser fluid outlet pipe 630 is located at the lowermost edge of the condensing chambers 616a, 616b, 616c and 616d.

The vapour compressor pump 622 is a liquid ring pump 622. The liquid ring pump 622 comprises a pump body 632, a pump compression chamber 634 provided within the pump body 632, a rotor 636 mounted within the compression chamber 634 and a rotor axle 638 to mount the rotor 636.

One or more ceramic bearings 640 are used to mount the rotor 636 to the rotor axle 638. In the present embodiment there are two ceramic bearings 640a, 640b, and these are a standard ball-bearing type two-way bearing. Although not specifically a thrust bearing, the bearings 640a, 640b provide a degree of resistance to any longitudinal displacement of the rotor 636 along the axle 638 and thrust bearings may be substituted. The axle 638 is fixed (i.e. does not rotate), but in the alternative, an axle may be mounted upon bearings with the rotor fixed to the axle, such that it would be the axle and rotor assembly that would rotate in unison, rather than the rotor about the axle.

The pump body 632 comprises a first body part 642, an intermediate body part 644, a sealing lid 646 and a retaining compression ring 648.

The first body part 642 is a generally flat cylinder (whose length to diameter ratio is in the approximate range of 1:2 to 1:4). The lowermost half of the length of the cylinder (from the perspective of the Figs) includes part of the compressor chamber 634 within which the rotor 636 is seated.

A liquid cooling jacket 650 comprising a rectangular toroidal depression surrounds the compressor chamber 634 separated by a jacket sidewall 652. Inlet liquid (i.e. the liquid, such as contaminated water, being distilled by the apparatus 610) is channelled around this liquid cooling jacket 650 to provide coolant to the fluids within the compressor chamber 634.

Input port 654 and output port 656 are provided through the first body part 642 which provide fluid communication ports into and out of the compression chamber 634. As can be seen from the Figs, these communicate from the uppermost edge of the first body part 642.

An axle receiving bore 658 is located at the centre of the first body part 642, and a lubricating port 660 is provided therein. The lubricating port 660 may allow lubricant (which may be the fluid being distilled e.g. water) to run down the axle and lubricate uppermost bearing 640a. Water, for example, may provide ample lubrication for the ceramic bearings of the type employed.

A magnet boss 662 is provided at the base of the rotor 636. In the present embodiment, it accounts for approximately 30% of the thickness of the rotor 636 (measured along the X-X axis) and provides a close but sliding fit with an interior bore 644a provided on the intermediate body part 644. The bore 644a provides part of the compression chamber 634. A plurality of rotor magnets 664 are provided around the circumferential edge of the magnet boss 662. There are twelve rotor magnets 664 equally spaced around the magnet boss 662. They are orientated with alternating poles i.e. N-S, S-N, N-S, etc. They are samarium high temperature magnets in the present embodiment, which offers a strong magnetic attraction and is chemically stable so would not contaminate the liquid being distilled. Other magnets may be used, for example Samarium-cobalt, GBD Neo or neodymium-iron-boron, which offer both high temperature and chemical stability.

Rotor 636 is of a typical shape of a liquid ring pump 622, comprising a central boss 636a from which extend a plurality of curved vanes 636b. The rotor 636 is generally circular and rotating within the offset confines of the compressor chamber 634 tends to cause a compression towards one side and a vacuum towards the other; this follows the general flow from input to output port.

A magnet boss 662 is provided at the base of the rotor. In the present embodiment, it accounts for approximately 30% of the thickness of the rotor (measured along the X-X axis) and provides a close but sliding fit with an interior bore 644a provided on the intermediate body part 644. The magnet boss 662, central boss 636a and curved vanes 636b form one piece in the present embodiment, which may be a machined, cast or printed part.

Figure 14:
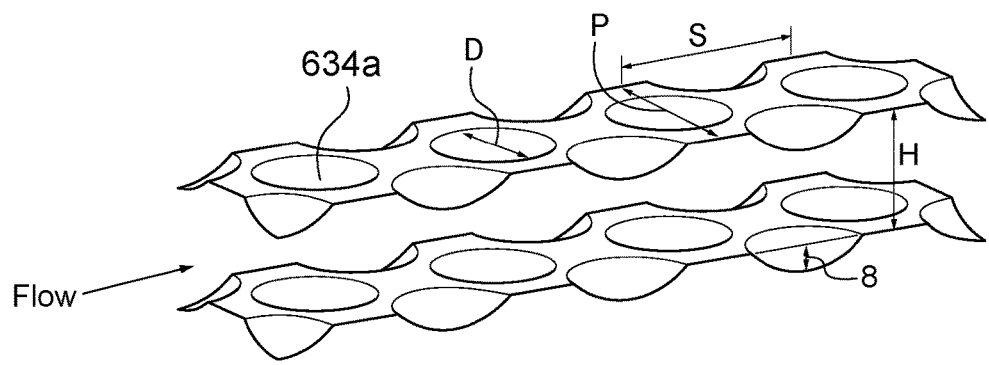
FIG. 14 is a perspective detail view of the interior surface of the liquid ring pump of FIG. 5.
Figure 15:
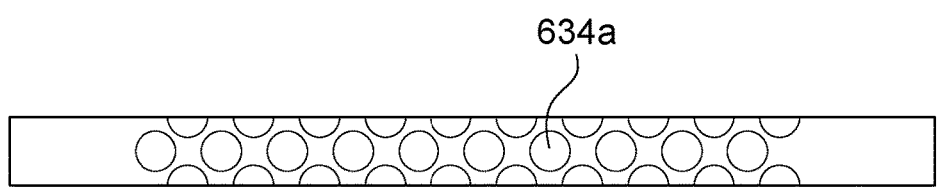
FIG. 15 is a plan view of the detail of FIG. 14.

The bore 644a provides part of the compression chamber 634. The compression chamber 634 has a substantially oval or obround cross-section as will be apparent from the Figs. The interior of the compression chamber is provided with a plurality of indentations 634a (See FIGS. 14 and 15). These indentations serve to cause turbulence in the vapour/liquid flow which may allow larger to droplets to form within the compression chamber 634.

A plurality of rotor magnets 664 are provided around the circumferential edge of the magnet boss 662. There are twelve rotor magnets 664 equally spaced around the magnet boss 662. They are orientated with alternating poles i.e. N-S, S-N, N-S, etc. They are samarium high temperature magnets in the present embodiment, which offers a strong magnetic attraction and is chemically stable so would not contaminate the liquid being distilled.

A periscope breather 668 connects the input port 654 to the head space 612b of the evaporation chamber 612 to the liquid ring pump 622. Operation of the liquid ring pump 622 creates a vacuum on the inlet side, drawing vapour within the headspace 612b into the liquid ring pump 622, and compressing it towards the outlet port 656, which in turn is connected to the condenser inlets.

The body is sealed by the lid 646. An axle receiving aperture 646a is provided on the lid to mount the axle.

An outlet pipe 686 attaches to all four of the condensing chambers 616 and to the outlet 656 of the liquid ring pump 622. This allows fluid to pass from the liquid ring pump 622 and into the condensing chambers 616.

An electric motor 670 is provided which connects to the rotor 636 via a transmission element 680. The transmission element 680 is a magnetic transmission element and comprises a magnet disk mount 682. A plurality of magnets 684 are provided around the outer circumferential edge of the magnet disk mount 682. There are twelve rotor magnets 684 equally spaced around the magnet disk mount 682. They are orientated with alternating poles i.e. N-S, S-N, N-S, etc. They are samarium high temperature magnets in the present embodiment.

As the electric motor 670 rotates the transmission element 680, the magnets 682 rotate around the X-X axis, and the attraction to the corresponding rotor magnets 662 causes the rotor 636 to rotate, thereby drawing vapour into the liquid ring pump 622.

The magnets 682 may be used both to spin the rotor 636 and may also create tension in a bearing 640 to mitigate backlash.

The pump 622 may provide the rotor element.

A pipe adapter 672 attaches to the top of the liquid ring pump 622, located on the opposite side to the motor 670. The pipe adapter 672 attaches over the inlet and outlet ports 654, 656 and the bores 658, 660. The pipe adapter 672 is made from a similar or identical material to the pump 622.

The pipe adapter 672 comprises a body 673, within which are adapter channels 674 which connect the inlet and outlet ports 654, 656 respectively to a tapped inlet and outlet sockets 675, 676. The tapped inlet socket 675 allows the periscope breather 668 to connect to the pipe adapter 672 and allow fluid to flow into the pump 622. The tapped outlet socket 676 allows the condensing chamber 616 to connect to the pipe adapter 672 via the pipe 686 and allow fluid to flow from the pump 622 to the condensing chamber 616. Furthermore, a condenser lubrication spout 677 is provided on the pipe adapter 672. This elongate spout provides a fluid path to the lubricating port 660 and allows a small amount of the vapour in the headspace to condense and trickle onto the ceramic bearings along the axle. One or more valves (not shown) may be provided to control the rate at which the condensed liquid trickles onto the axis and therefore into the bearings.

It will be noted that gravity (as will subsequently be described) plays a significant role in the functioning of the apparatus 610, such that the orientations shown in the Figs conforms to that of a preferred real-life installation (gravity applying in a vector from the top of the page towards the bottom).

It will therefore be appreciated that the vapour compressor pump 622 is located below the evaporation chamber 612. Moreover, a lower portion of the evaporation chamber 612 defines a liquid holding volume or space 612a and an upper portion of the evaporation chamber 612 defines an upper or vapour headspace 612b. Gravity will cause liquid to pool in the lower liquid holding space 612a. It should be noted that a significant proportion (at least 50 to 80%) of the height of the condensing chambers 616 are located within that locus (i.e. submerged within the liquid being distilled). This potentially provides an improved heat transfer and therefore improvement in condensation rates.

Vapour V is pulled through the liquid ring pump 622 via the inlet 654. It enters the compression chamber 634 and is compressed into a wetter vapour, with significantly sized suspended liquid droplets. This wetter vapour is ejected via the outlet port 656 towards and into the condensing chambers 616. These are cooled by the pooled liquid in lower liquid holding space 612a and cause the wet vapour to condense along the bottom surface of the condensing chamber chamber(s) 616.

Figure 12:
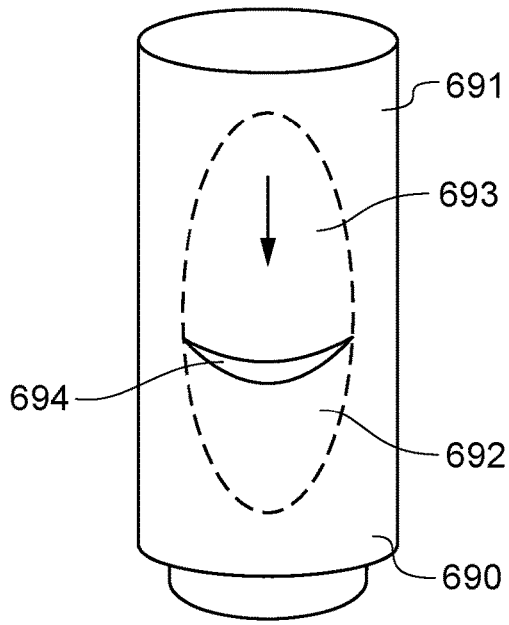
FIG. 12 is a schematic representation of an expansion tank usable with the apparatus of FIG. 1.
Figure 13:
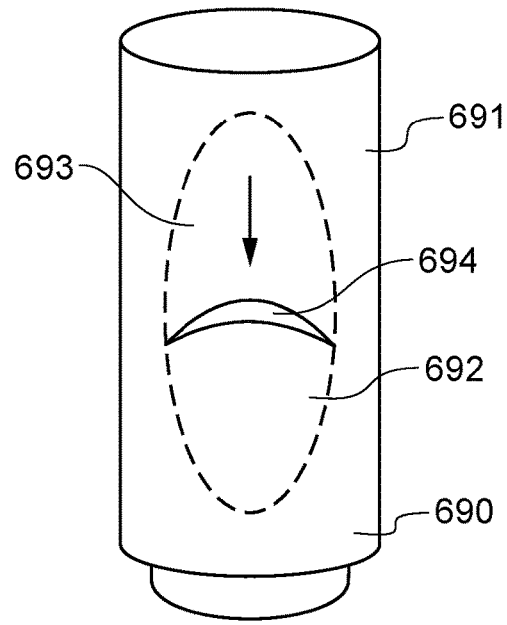
FIG. 13 is a further schematic representation of the expansion tank of FIG. 12.

An expansion tank 690 Is used with the distillation apparatus 610. This is a diaphragm-style expansion tank in the present embodiment and is used to compensate for pressure differences in the apparatus 610 between a non-working state (FIG. 12) and an operating state (FIG. 13).

The expansion tank 690 comprises a pressure vessel 691 with a lower liquid side 692 and an upper pressurised gas side 693. The upper pressurised gas side 693 has a set volume of gas and therefore a set pressure (assuming minor temperature effects). A diaphragm 694 separates the two areas and as the pressure of the liquid side varies, the position of the diaphragm 694 moves to allow for changes in the lower liquid side and to maintain s suitable back pressure on the apparatus 610.

The evaporation chamber 612 is intended to operate in the 1-2 bar range, preferably around 1.4 bar. A safety valve 699 is provided on the evaporation chamber set to vent at between 2-3 bar pressure. The internal operating temperature of the evaporation chamber is intended to be around the 125-140 degrees Celsius range.

The starting operation for the apparatus 610 is open the valve on the fluid inlet 618 and fill the evaporation chamber 612 to defined level (80-90% of full). The heat source 614 is activated to allow the fluid in the evaporation chamber 612 to reach 100-102 C, thereby causing water vapour/steam to accumulate in the upper part, e.g., headspace 612b, of the chamber 612.

The vent valve 699 is then opened to vent the steam and air somewhere (to the drainage). While this happens, there might be some condensation happening in the pump 622 to essentially provide enough distillate inside the pump 622 to begin distillation.

The pump 622 draws vapour down the periscope breather 668.

The material of the various components of the pump 622 will be non-reactive with the liquid being distilled. In the current embodiment which envisages a water distillation process, the rotor and body components may be an inert material, and in this case materials such as food grade plastics, stainless steels, or anything with contamination rates falling within acceptable parameters are possible.

It will be appreciated by the skilled addressee that the magnet pairs in the transmission/rotor may be replaced with a pair of magnets/ferromagnetic material.

Referring to FIG. 16, a second embodiment distillation apparatus 10 is depicted which comprises a water inlet pipe 12, which feeds into an evaporation chamber 14. The evaporation chamber 14 may be made of any suitable material, and in this particular embodiment is a suitable stainless steel.

A heating coil 16 is located within the evaporation chamber 14. This is of a type well known in the art and is electrical in the present embodiment. An untreated water sump 17 is defined at the lowermost portion of the evaporation chamber 14. The outer cylindrical wall 15 of the evaporation chamber 14 is formed from a corrugated structure.

A casing 18 surrounds the evaporation chamber 14 and is likewise formed preferably from a suitable stainless steel. The casing 18 has a double wall insulated construction and serves as a pressure vessel for the internal components.

A condensing chamber 20 is defined within the casing 18 between the interior surface of the casing 18 and the evaporation chamber 14. The condensing chamber 20 may be lined with a suitable material, such as ceramic, glass or plastics to mitigate corrosion of the casing 18 and to maintain water purity.

A distilled water sump 22 is defined at the lowermost portion of the condensing chamber 20. A distilled water outlet pipe 24 is provided through the sidewall of the casing, connecting the sump 22 to a tap or faucet 26. The sump 22 is constructed from a similar stainless steel material as the previous components described, but may alternatively made from a suitable plastics or rubber material. Furthermore, it may be provided with substantially inert coating such as glass, ceramic or plastic, to mitigate contamination of distilled water.

A valve (not shown) and/or a pump (not shown) may be provided at some point along the distilled water outlet pipe 24 to allow distilled water to be transported to the tap or faucet 26.

Moreover, a valve (not shown) and/or a pump (not shown) may be provided at some point along the water inlet 12 to allow any variability in pressure and/or flowrate to be adjusted for.

There is provided in the present embodiment a refrigeration system 25 provided between the distilled water outlet pipe 24 and the tap or faucet 26. This refrigeration system 25 comprises a fluid conduit surrounded by a suitable heat exchanger.

A vapour compressor pump 28 is provided within the casing 18 situated atop the condensing chamber 20. A suction port 30 connects the evaporating chamber 14 to the vapour compressor pump 28.

The vapour compressor pump 28 in the present embodiment is a liquid ring pump 28. The liquid ring pump 28 comprises a generally cylindrical outer pump casing 32, which defines a suction port 34 and discharge port 36 located on opposite sides of the casing 32. An impeller 38 is mounted within the casing and rotates on ceramic bearings 40. Since the bearings 40 of a such a liquid ring pump 28 will, in use, be exposed to the fluid being compressed once liquefied, use of ceramic bearings 40 circumvents inevitable corrosion problems from using metallic bearings. Ceramic ball bearings 40 are used in the present embodiment, but other types may be substituted depending on such factors as cost, wear, service intervals and so forth. The vapour compressor pump is powered by a motor (not shown).

The impeller 38 is constructed from aluminium or aluminium alloy in the present embodiment, and may be anodised or otherwise surface treated to mitigate corrosion. It will be appreciated that alternative material choices are possible.

A discharge pipe 41 connects the discharge port 36 to the condensing chamber 20.

A liquid drain pipe 42 is provided through the lowermost portions of the casing 18 and the evaporation chamber 14 and entering into the untreated water sump 17. A drain valve (not shown) controls liquid flow from the liquid drain pipe 42.

The first embodiment 10 in use is fed with water $W_1$ from a mains water feed, but it will be understood that being distillation apparatus it may cope with less pure sources of water.

The water $W_1$ enters into the evaporation chamber 14 where it is heated to a vapour $V_1$ by the action of the heating coil 16. The vapour $V_1$ is drawn through the suction port 30 by and into the vapour compressor pump 28. A wetter vapour $V_2$ and condensed (and therefore distilled) water $W_2$ exit the vapour compressor pump 28 and are pumped through the discharge pipe 41 and directed onto the evaporation chamber 14.

The temperature of vapour $V_2$ is greater than that of vapour $V_1$ and therefore heat is transferred into the condensation chamber 14 by the condensation of the water $W_2$ and thereby increasing the efficiency of the apparatus by recycling some of the waste heat.

Distilled water $W_2$ pools in the sump 22 and is available for further use by taking it via the distilled water outlet pipe 24.

A third embodiment of the present invention is depicted in FIG. 20 generally referred to as 110. Similar or identically functioning components as in the second embodiment are numbered similarly with the addition of the prefix 1 and description of identical or near-identical components may be omitted in favour of inference from the above description.

Distillation apparatus 110 comprises an evaporation chamber 114 and a condensing chamber 120. They are arranged side-by-side, with a corrugated heat exchanger 119 being shared as a joint sidewall of the two chambers 114, 120. The heating coil has been omitted for clarity.

The corrugated heat exchanger 119 is a structural element of the apparatus 110 and serves a first function of ensuring pressure integrity of both chambers 114, 120. The corrugation increases its strength and mitigates any buckling due to a pressure differential existing between the two chambers 114, 120.

The corrugation also increases the surface area of the heat exchanger 119 thereby increasing heat transfer from the condensing chamber 120 to the evaporation chamber 114.

Furthermore, the vapour compressor pump 128 has some modifications, which the skilled addressee will appreciate may be readily applied to the vapour pumps of alternative embodiments described herein.

A priming reservoir 135 is provided adjacent the impeller 138 at the lowermost portion of the liquid ring pump 128.

Liquid ring pumps require a level of liquid to be present at their lowermost portion to enable compression of the vapour between the impeller and this liquid. Gravity draws the liquid to this point.

Also shown is a motor 137 and a radiator 139 to cool the motor 137. The motor 137 is an electric motor in the present embodiment.

As water $W_1$ enters into the evaporation chamber 114 it is heated to a vapour $V_1$ by the action of the heating coil (not shown). The vapour $V_1$ is drawn through the suction port 130 by and into the vapour compressor pump 128. A wetter vapour $V_2$ and condensed (and therefore distilled) water $W_2$ exit the vapour compressor pump 128 and are pumped through the discharge pipe 141 and directed onto the corrugated heat exchanger 119.

Standard operating conditions for this embodiment will have vapour temperature around 130° C. in the condensing chamber 120, with around 100° C. in the evaporation chamber 114. Thus appreciable heat transfer should be evident through the corrugated heat exchanger 119.

Furthermore, a second heat exchanger 150 is provided which provides a thermal transfer area between the distilled water outlet pipe 124 and the water inlet pipe 112.

This serves two important functions: (1) cooling the outlet distilled water and (2) pre-heating the inlet water. Function (1) allows for more usable outlet water and (2) increasing efficiency by recycling some waste heat.

Additional cooling or refrigeration may still be desirable after the distilled water exits the second heat exchanger 150.

A fourth embodiment distillation apparatus 210 is depicted in FIGS. 22 and 23. Similar or identically functioning components as in the second and/or third embodiments are numbered similarly with the addition of the prefix 2 and description of identical or near-identical components may be omitted in favour of inference from the above description.

As can be seen from the plan view of FIG. 22, the evaporation chamber 214 is located within the condensing chamber 220, and both have a generally circular cross section, although in alternative embodiments only one of these may have such a cross section and the other may have a different cross-section, such as square, rectangular, pentagonal, hexagonal, etc.

Moreover, it will be noted that the evaporation chamber 214 is not only simply circular in its exterior cross-section, but also has an interior cylindrical passage, thus creating a toroidal prism shape. As will be appreciated from FIG. 22, the interior and exterior corrugation of the evaporation chamber 214 increases the heat transfer area between the two water sumps 217, 222.

Further, the discharge pipe 241 is submerged within the head 270 of water within the condensing sump 222, and additional heat transfer takes place between the vapour $V_2$ and the water $W_2$.

A bubble diffuser or the like may be provided through which the vapour $V_2$ is forced prior to entry into the water $W_2$.

This may increase the relative surface area to the volume, potentially intensifying the condensation.

The pump 228 is situated generally atop the evaporation chamber 214, and directs vapour down towards the interior surface of the evaporation chamber 214.

As vapour $V_2$ condenses into water $W_2$ and thereby transfers heat to the evaporation 214, the residual heat in the pressurised water $W_2$ which pools in the evaporation sump 222 provides an initial pre-heating to the inlet water $W_1$ as its held within the sump 217 of the evaporation chamber.

Furthermore, for optimal performance, only vapour $V_1$ should enter the liquid ring pump 228.

Therefore, a static cyclone separator 260 is provided on the apparatus 210 between the evaporating chamber 214 and the liquid ring pump 228. This separates larger water droplets outwardly, collecting on an inner surface of the cyclone separator 260 and being returned to the sum 217 of the evaporation chamber 214.

An alternative possibility is for the outer pump casing 232 may be rotatable to function as cyclone.

Furthermore, the liquid ring pump 228 is primed by its positioning in relation to a maintained head 270 of the water in the condensation chamber 220 is higher than the level needed in the liquid ring pump 228 and a conduit is provided which ensures that the maintained head 270 constantly provides the liquid ring pump 228 with the necessary depth of water to maintain it in a primed, ready-to-operate state. Additional valves, pumps and/or sensors may be provided to monitor and maintain the level of the maintained head 270, and microprocessors/hardware/software and the like may be provided to enable the system to operate properly.

Moreover, the discharge pipe 241 is directed into the sump 222, beneath the head 270 of the water $W_2$ in the condensation chamber.

A vent valve 244 is provided on the top of the condensation chamber 220 to regulate pressure within the condensation chamber 220.

In an envisaged priming method for the apparatus 210 (and potentially applicable to all described embodiments) may be primed by pre-heating the apparatus 210 and therefore increasing the gas pressure within the apparatus, the vent valve 244 may open to vent this pressure. The vent valve may open mechanically upon application of a predetermined pressure, or may be opened upon application of a control signal which may be derived from the measurement of both pressure and other salient properties.

Figure 24:
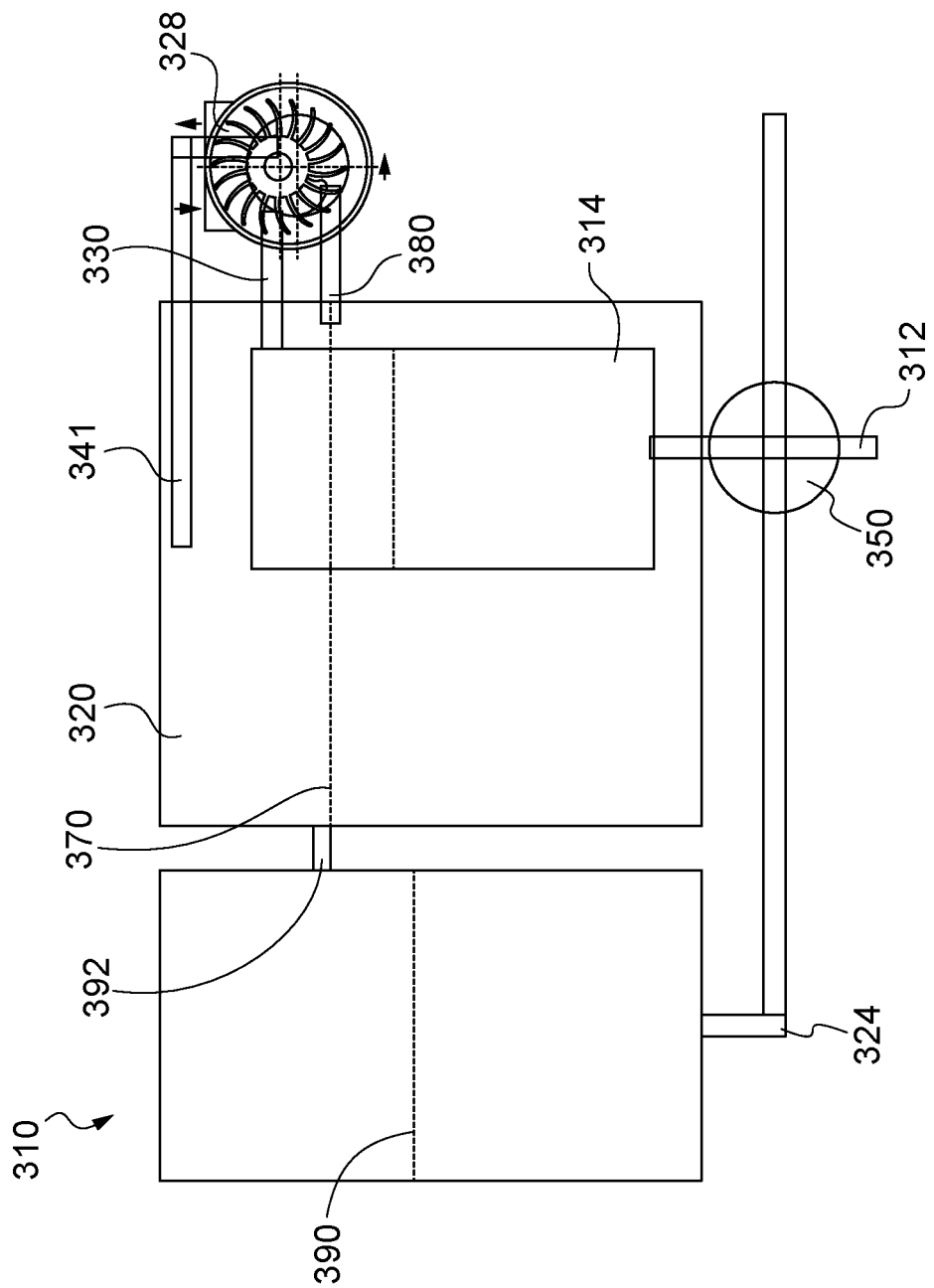
FIG. 24 is a schematic representation of a fourth embodiment distillation apparatus according to the present invention.

A fifth embodiment distillation apparatus 310 is depicted in FIG. 24. Similar or identically functioning components as in the second and/or third embodiments are numbered similarly with the addition of the prefix 3 and description of identical or near-identical components may be omitted in favour of inference from the above description.

This is a further modified system which seeks to maintain a primed state for the liquid ring pump 328, and likewise comprises an evaporation chamber housed within a condensation chamber 320, where the liquid ring pump 328 is fed by a conduit 380 from the condensation chamber 320, wherein the level of the maintained head 370 within the condensation chamber 320 maintains a primed level of liquid in the liquid ring pump 328.

To prevent the maintained head 370 rising over a predetermined level, a spillover tank 390 is provided with an overflow drain 392 connecting the spillover tank 390 to the condensation chamber. Given that the spillover tank 390 will only be exposed to distilled water, it too may be provided with a coating as described above to mitigate contamination.

The spillover tank 390 is from where the distilled water is drawn and before it is fed into the second heat exchanger 350. It will be appreciated that the spillover tank may be separately refrigerated, or indeed stored within a further heat exchanger to further reduce the output water temperature to more usable levels. If this is sufficient, the second heat exchanger may be omitted in a further embodiment.

Figures 25, 26:
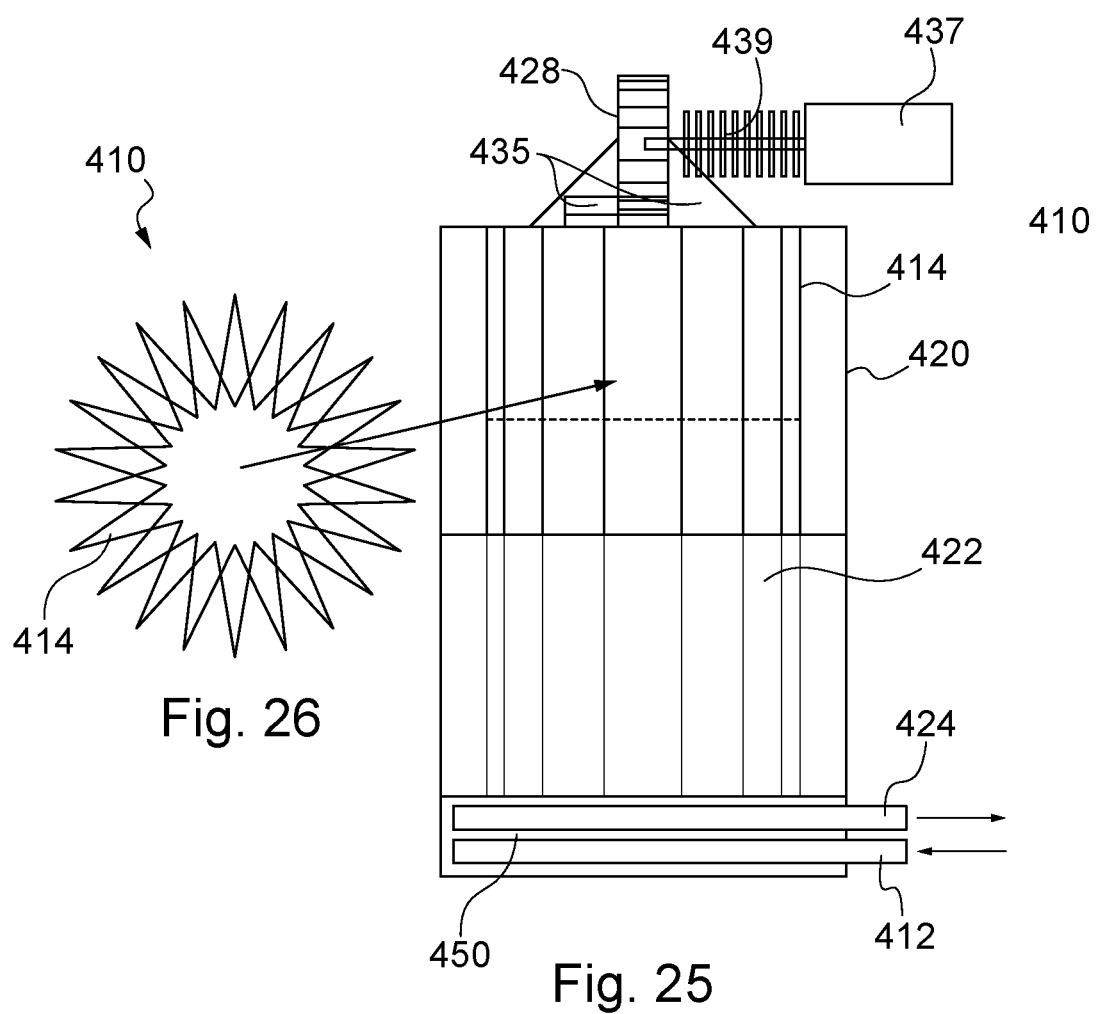
FIG. 25 is a schematic representation of a fifth embodiment distillation apparatus according to the present invention.
FIG. 26 is a plan view of a heat exchanger of the apparatus of FIG. 25.

A fifth embodiment distillation apparatus 410 is depicted in FIGS. 25 and 26. Similar or identically functioning components as in the second and/or third embodiments are numbered similarly with the addition of the prefix 4 and description of identical or near-identical components may be omitted in favour of inference from the above description.

This has an evaporation chamber 414 within a condensation chamber 420 arrangement, with the outer surface of the evaporation chamber 414 being corrugated to both increase strength and surface area. The liquid ring pump 428 is provided with a similar priming reservoir 435 as described with respect to the second embodiment, and further there is shown detail of a motor 437 and a radiator 439 arrangement.

The inner surface of the condensation chamber 420 is a simpler cylindrical shape.

The second heat exchanger 450 is provided immediately beneath the sump 422 of the condensation chamber 420.

Figure 27:
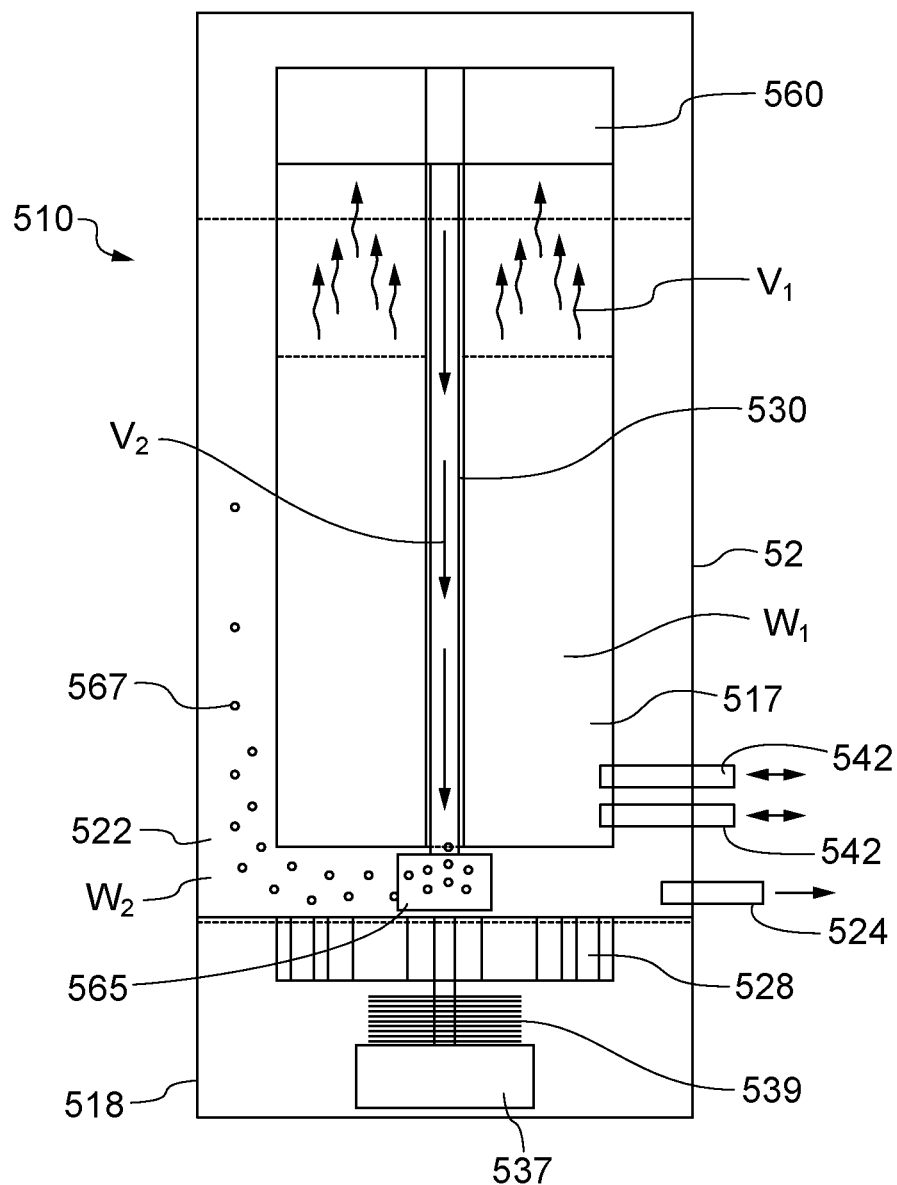
FIG. 27 is a schematic representation of a sixth embodiment distillation apparatus according to the present invention.

A sixth embodiment distillation apparatus 510 is depicted in FIG. 27. Similar or identically functioning components as in the first and/or second embodiments are numbered similarly with the addition of the prefix 5 and description of identical or near-identical components may be omitted in favour of inference from the above description.

In the sixth embodiment, liquid ring pump 528 is located at the bottom of the apparatus 510, adjacent the condensation sump 522. By placing the liquid ring pump 528 at the bottom portion of the device, and beneath sump 522, it ensures that a consistent water level may be maintained within the pump 528 by relying on gravity, potentially with a float valve or the like added to maintain that water level.

A cyclone 560 is located at the uppermost portion of the toroidal prism-shaped evaporation chamber 514 which collects the rising water vapour V1, thereby forcing water droplets to the outer edges of the cyclone 560 re-entering the evaporation chamber as they fall back down towards the untreated water W1 collecting in the evaporation chamber slump 517.

There is provided an elongate port pipe 530 down which the "drier" vapour $V_2$ is pumped by action of the cyclone 560.

An aluminium oxide porous bubble diffuser 565 is situated at the exit of the elongate port pipe 530 and is submersed within the condensed water $W_2$ which has collected in the condensation chamber sump 522.

The aluminium oxide porous bubble diffuser 565 forces the vapour $V_2$ into a greater number of smaller bubbles 567, thereby increasing the surface area to potentially improve heat transfer from the bubbles 567 containing the vapour $V_2$ improving its condensation into water $W_2$.

Each of the described features of the described embodiments may be used to modify other described embodiments, or indeed may be replicated in a single embodiment without departing from the scope of the present invention.

Furthermore, in addition to the described priming measures and systems, each of the described embodiments may be provided with one or both of a vacuum pump and/or an external heating system, to enable the apparatus to move from an off state to a working state.

The vacuum pump, or indeed a further vacuum pump, may operate to reduce the overall working pressure of the system to below gauge pressure, thereby improving evaporation in the evaporation chamber.

Equally, the system may be pressurised above gauge pressure if this improves heat transfer rates and/or evacuation of distilled water from the system.

Each of the described embodiments may be provided with sensors monitoring various operating conditions within the system, such as pH of water, temperatures, pressures, motor speeds and so forth, and this may be used to monitor the operation of the apparatus or may be used as control inputs to control the operation of the system.

Each of the described embodiments may be provided with cleansing modifications, such that the evaporation, condensation and/or spillover tanks may be cleaned by the use of, for example, chemical cleansers, physical scrubbing cleansers and so forth.

It will be apparent that the apparatus may be used to distil any aqueous solution or mixture that it may be advantageous to do so with, such as alcoholic beverages.

Moreover, since output water may be at an elevated temperature, the distillation apparatus may be used, or combined within further apparatus to create suitable apparatus for, the production of distilled water for cooking, drinking (with tea, coffee or the like), bathing, swimming, etc.

The invention is not limited to the embodiments hereinbefore described, but may be modified both in construction and detail. It will be readily apparent that features from individual embodiments may be combined to create new embodiments within the scope of the present invention.

For example, scraper systems may be added to the evaporation chambers in order to mitigate the build up or solutes and contaminants that may be build up at the base of the evaporation chamber.

An electronic control system may be provided that measures the parameters and then optimises the apparatus 10, 110, 310, 410, 510, 610 based on those measurements. The parameters may include:
1. Water level, temperature, pressure in evaporation chamber
2. flow and temperature of the steam, pump's RPM and temperature in the cooling jacket.
3. Water level, temperature, pressure in condensation chamber
4. Flow meter on distillate to water heat exchanger
5. Water level, temperature, pressure in expanding bladder tank
6. fluid chiller, and chemical composition sensor before and after the mineralisation cartridge.

Which may be used to control: Pressure inside the evaporation chamber, pump's RPMs, cooling jacket fluid flow, distillate output, vent valve, fresh water inlet valve, dirty water inlet valve, distillate outlet valve, and the heater (for the start of the system).

In addition, the system may be provided with suitable refrigeration and mineralisation cartridges.

The vapour compressor pump may be a lubricating gerotor pump.

The invention claimed is:
1. A distillation apparatus comprising:
   an evaporation chamber;
   a fluid inlet connected to the evaporation chamber and for supplying liquid to be distilled to the evaporation chamber;
   a heat source arranged to provide heat to the liquid in the evaporation chamber so as to evaporate the liquid in the evaporation chamber,
   a condensing chamber,
   one or more condenser fluid outlets attached to the condensing chamber;
   a vapour compressor pump;
   a vapour inlet;
   a periscope breather connecting a head space of the evaporation chamber with the vapour compressor pump;
   a pump outlet; and
   a vapour outlet pipe which connects the pump outlet to the condensing chamber, wherein
  (i) the condensing chamber is located partially or wholly within the evaporation chamber; or
  (ii) the evaporation chamber is located within the condensing chamber, and
the vapour compressor pump is at least one of located below the condensing chamber or positioned equal to or below a maintained head of the distillate in the condensing chamber, such that, in use, distillate from the condensing chamber falls into the vapour compressor pump under the action of gravity so as to maintain the vapour compressor pump in a primed state.

2. The distillation apparatus according to claim 1, wherein at least one of:
  the condensing chamber has at least one of a larger internal or external surface area than an internal surface of the evaporation chamber;
  the condensing chamber comprises a square face with connecting webs;
  the condensing chambers comprises a cuboidal shape with a width:height:depth ratio of 20:20:1; and
  the condensing chamber comprise one or more internal condenser fins.

3. The distillation apparatus according to claim 1, wherein the vapour compressor pump is a liquid ring pump.

4. The distillation apparatus according to claim 3, wherein the liquid ring pump comprises a pump body, a pump compression chamber provided within the pump body, a rotor mounted within the compression chamber, a rotor axle to mount said rotor, the rotor being provided with one or more ceramic bearings to mount the rotor to the rotor axle.

5. The distillation apparatus according to claim 4, wherein the rotor includes one or more magnets and wherein optionally there are a plurality of magnets surrounding the rotor axle embedded within the body of the rotor.

6. The distillation apparatus according to claim 1, wherein the vapour compressor pump includes a rotor rotating on a vertical axis.

7. The distillation apparatus according to claim 1, further including an electric motor to power the vapour compressor pump and a magnetic transmission element coupled to the electric motor, and wherein optionally the magnetic transmission element comprises a motor ring with one or more magnets provided around the motor ring.

8. The distillation apparatus according to claim 1, wherein the condensing chamber is one of a plurality of condensing chambers.

9. The distillation apparatus according to claim 8, wherein the plurality of condensing chambers include four condensing chambers.

10. The distillation apparatus according to claim 8, wherein the plurality of condensing chambers share a single condenser fluid outlet pipe.

11. The distillation apparatus according to claim 1, wherein the plurality of condensing chamber includes one or more internal condenser fins.

* * * * *